(12) United States Patent
Morse et al.

(10) Patent No.: US 7,931,993 B2
(45) Date of Patent: Apr. 26, 2011

(54) METHOD OF PREPARATION OF BONDED POLYIMIDE FUEL CELL PACKAGE

(75) Inventors: Jeffrey D. Morse, Martinez, CA (US);
Alan Jankowski, Livermore, CA (US);
Robert T. Graff, Modesto, CA (US);
Kerry Bettencourt, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1673 days.

(21) Appl. No.: 11/153,586

(22) Filed: Jun. 14, 2005

(65) Prior Publication Data
US 2006/0000548 A1 Jan. 5, 2006

Related U.S. Application Data

(62) Division of application No. 10/261,353, filed on Sep. 30, 2002, now Pat. No. 6,960,403.

(51) Int. Cl.
*H01M 8/00* (2006.01)
*B32B 37/00* (2006.01)

(52) U.S. Cl. ...... 429/433; 429/483; 429/535; 156/307.7

(58) Field of Classification Search ............... 429/26, 429/30, 34, 36, 38, 39
See application file for complete search history.

(56) References Cited

U.S. PATENT DOCUMENTS

| | | | |
|---|---|---|---|
| 6,143,412 A * | 11/2000 | Schueller et al. | 428/408 |
| 2003/0064275 A1 * | 4/2003 | Morse et al. | 429/38 |

OTHER PUBLICATIONS

Office Action Summary from U.S. Appl. No. 11/153,692 mailed on Feb. 11, 2009.
Office Action Summary from U.S. Appl. No. 11/153,692 mailed on Aug. 20, 2009.

* cited by examiner

*Primary Examiner* — Dah-Wei Yuan
*Assistant Examiner* — Angela J. Martin
(74) *Attorney, Agent, or Firm* — Eddie E. Scott; James S. Tak

(57) ABSTRACT

Described herein are processes for fabricating microfluidic fuel cell systems with embedded components in which micron-scale features are formed by bonding layers of DuPont Kapton™ polyimide laminate. A microfluidic fuel cell system fabricated using this process is also described.

17 Claims, 8 Drawing Sheets

METHOD OF PREPARATION OF BONDED POLYIMIDE FUEL CELL PACKAGE

CROSS-REFERENCE TO RELATED APPLICATION

This application is a divisional of Application Ser. No. 10/261,353 filed on Sep. 30, 2002 now U.S. Pat. No. 6,960,403 entitled "A Bonded Polymide Fuel Cell Package and Method Thereof".

The United States Government has rights in this invention pursuant to Contract No. W-7405-ENG-48 between the United States Department of Energy and the University of California for the operation of Lawrence Livermore National Laboratory.

BACKGROUND

This invention relates to fuel cells. Work is commonly derived from fuel by a combustion process which uses the pressure of expanding gases to turn a turbine or move a reciprocating piston and, ultimately, to provide torque to a driveshaft. This torque is then usually used for propulsion or to generate electrical power. In the latter case, the electrical power is often reconverted into mechanical work.

SUMMARY OF THE INVENTION

An aspect of the invention includes an apparatus comprising: a plurality of polyimide layers wherein, at least one layer contains at least one resistive heater, at least one layer contains at least one microfluidic channel, at least one layer contains at least anode manifold having a flowing means for a fuel to flow to an anode, at least one layer contains a cathode manifold having removing means for removing reaction by-products from the cathode; an MEA layer, wherein the MEA comprises an electrolyte sandwiched between an anode and a cathode; an electrical feedthrough extending through all layers; and a fuel feedthrough extending through at least four of the layers to form a bonded polyimide microfluidic fuel cell system.

Another aspect of the invention includes an apparatus comprising: a first polyimide layer containing a plurality of resistive heaters; a second polyimide layer for insulating the resistive heaters; a third polyimide layer containing a plurality of microfluidic channels communicating with a fuel source at one end and a fuel feedthrough at the other end; a fourth polyimide layer comprising an anode manifold containing (a) a fourth layer fuel inlet communicating with the fuel feedthrough, (b) a porous membrane, (c) a fourth layer fuel outlet, wherein the fourth layer fuel inlet and outlet are configured such that fuel flows horizontally through the fourth layer fuel inlet, then vertically up through the porous membrane, wherein whatever portion of fuel that does not flow vertically through the porous membrane continues to flow horizontally through the fourth layer fuel outlet; a fifth polyimide layer for supporting the anode manifold and containing a fifth layer fuel feedthrough communicating with the fourth layer fuel outlet; an MEA layer containing an MEA, wherein the MEA comprises an electrolyte sandwiched between an anode and a cathode, the MEA operating at a temperature less than 200° C., wherein the anode is positioned such that it is communicating with the porous membrane of the fourth layer, wherein the fifth layer forms a seal between the porous membrane and the anode; a sixth polyimide layer for supporting a cathode manifold, wherein the sixth polyimide layer contains a sixth layer fuel feedthrough communicating with the fifth layer fuel feedthrough,; and a seventh polyimide layer containing (a) a cathode manifold comprising a plurality of microchannels communicating with the cathode, wherein the microchannels are used for removing reaction by-products from the cathode, wherein the sixth layer forms a seal between the cathode manifold and the cathode, and (b) a seventh layer fuel feedthrough communicating with the sixth layer fuel feedthrough; wherein an electrical feedthrough extends through all the layers of the apparatus to form a bonded polyimide microfluidic fuel cell system.

A further aspect of the invention includes a process comprising: patterning a plurality of polyimide preform layers; bonding a portion of the plurality of polyimide preform layers together; positioning an MEA layer containing an MEA onto the bonded portion of polyimide preform layers; positioning the remainder of the perform layers onto the MEA; and curing to form a bonded polyimide microfluidic fuel cell system, wherein the bonded polyimide microfluidic fuel cell system has a means to electrically connect all layers.

A further aspect of the invention includes a process comprising: patterning a first plurality of polyimide preform layers, wherein at least one layer has means to heat an MEA, at least one layer has means to distribute fuel to the anode of the MEA; bonding a the first plurality of polyimide preform layers together; positioning an MEA layer containing an MEA onto the bonded polyimide preform layers; patterning a second plurality of polyimide perform layers, wherein at one layer has means to remove bi-products from the cathode of the MEA; positioning the second plurality of perform layers onto the MEA; and curing to form a bonded polyimide microfluidic fuel cell system, wherein the bonded polyimide microfluidic fuel cell system has a means to electrically connect all layers.

DETAILED DESCRIPTION

Figure 1:
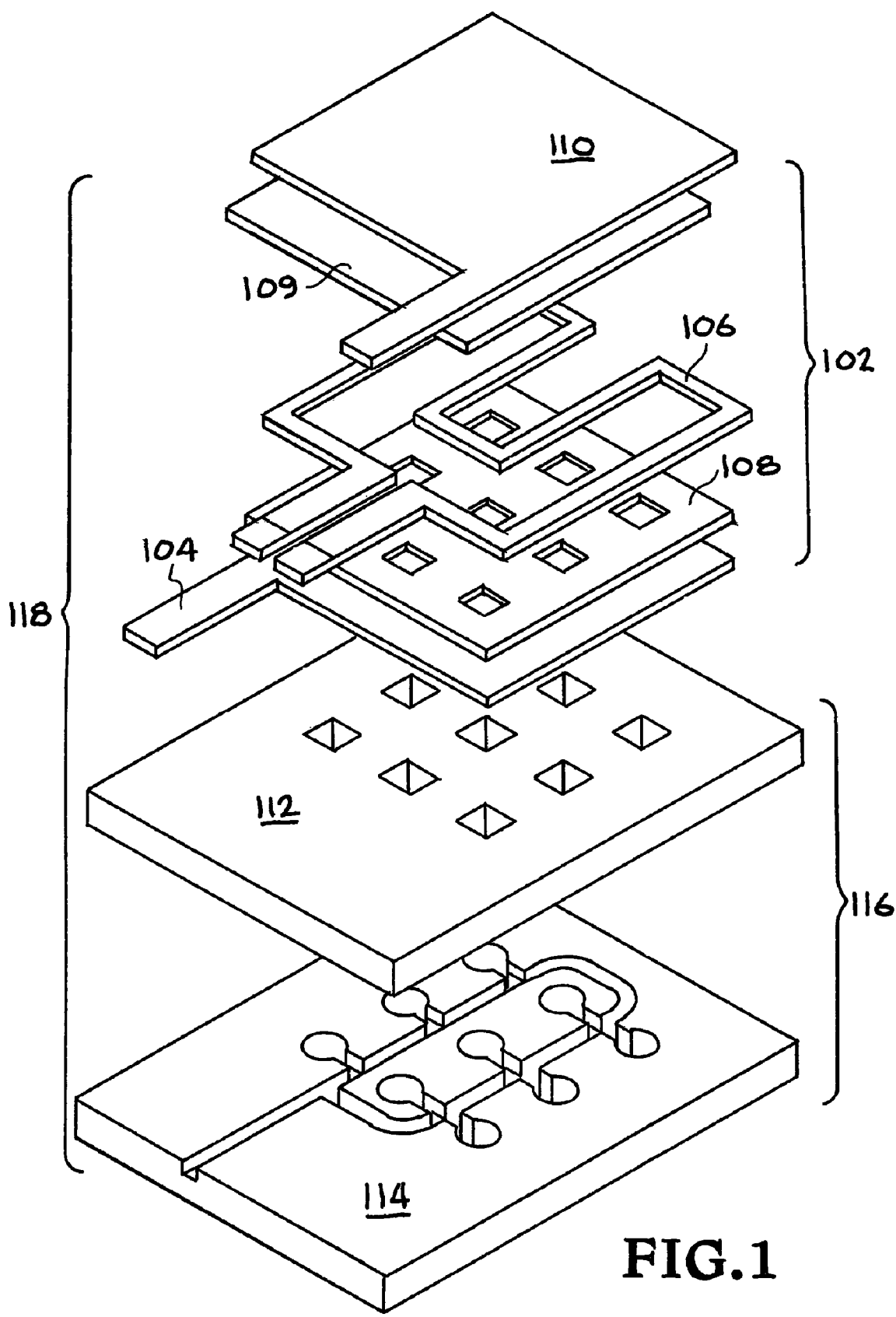
FIG. 1 shows an expanded 3-dimensional layout of one embodiment of a microfluidic fuel cell system.

Described herein is a process for fabricating microfluidic systems suitable for use with a variety of fuel cells that operate at temperatures up to 200° C. These fuel cells are described in detail in pending U.S. patent application Ser. No. 09/241,159, "MEMS-based thin film fuel cells", assigned to the same assignee, which is hereby incorporated by reference. The microfluidic systems described herein can be arranged in series and/or in parallel and have power outputs ranging from 100 milliwatts to 20 Watts.

The foundation of the fuel cell is formed by a polyimide laminate comprising layers of DuPont Kapton™ (the trade name for polyimide). Each layer is coated with Dupont TEFLON® FEP fluorocarbon film that is bonded to Dupont Kapton™ HPP-ST polyimide film. An anode electrode is deposited on top of or attached to a porous membrane. The porous membrane can be a layer of polyimide into which a high density array of very narrow channels, i.e., an array greater than 104 channels/cm$^2$ having channel widths or diameters less than 10 μm, has been cut. This array can be created in various patterns by a variety of etch techniques which include photolithography, wet or dry chemical etching, laser machining or ion tracking lithography. A layer of polyimide having a thickness ranging from 25-50 µm is desirable regardless of which technique is used. The porous membrane can also comprise other plastic materials already having a high porosity, for example, those typically used in microfiltration. The plastic materials typically come in sheets and have submicron diameter pores and thicknesses ranging from 10-100 µm. Additional porous laminate layers can be used to embed a resistive heater directly beneath the fuel cell device to control the fuel cell temperature.

These laminate bonded polyimide structures form the basis of the microfluidic system that controls the delivery of gas or liquid fuels to the membrane electrode assembly (MEA), also referred to as the fuel cell, portion of the fuel cell package. The MEA is the electrode/electrolyte/electrode portion, including catalysts materials and any additional components that may be sandwiched in between the two electrodes. For example, an effective MEA comprises a first Nafion™ layer containing an anode catalyst, e.g., carbon or metal, and a catalyst material, e.g., Pt—Ru; a second Nafion™ layer as the electrolyte; and a third Nafion™ layer containing a cathode catalyst, e.g., carbon or metal, and a catalyst material, e.g., Pt. These laminate bonded polyimide microfluidic structures can be used with a proton exchange membrane fuel cell, i.e., the Nafion™ MEA just described, or any fuel cell operating at temperatures up to 200° C. They can also be used to form a porous flow field structure for support of the MEA, form suitable sealing and bonding of the structure, embed microfluidic connection and control devices, including pumps and valves, and facilitate scaling and stacking via continuous three dimensional flow channels.

Micromachining is used to create a preform. The preform is then aligned and bonded to another layer of polyimide or another material such as PDMS, glass, or silicon. The surface comes prepared with a bonding adhesive, e.g., Dupont TEFLON® FEP, thereby forming a sealed bond suitable for fluidic transport. Embedded within the sealed and bonded polyimide laminate layers can be valves, fluidic connectors, silicon micromachined components, and resistive heaters. In addition, high-density micropores can be formed in a thin layer of the polyimide laminate material to create a porous membrane suitable for distributing fuel to a high surface area anode/cathode gas diffusion electrode fuel cell configuration.

FIG. 1 shows an expanded 3-dimensional layout of one embodiment of a microfluidic fuel cell package formed using the polyimide laminate preform bonding process. Referring to the embodiment shown in FIG. 1, an MEA 102 comprises an anode 104, a restive heater or a plurality of resistive heating elements 106, a heater isolation layer 108, an electrolyte 109 and a cathode 110. A micromachined manifold system 112 and a support structure 114, which together are referred to as a microfluidic fuel distribution structure 116, are bonded to MEA 102 forming a sealed microfluidic fuel cell package 118. Fuel is able to flow horizontally through the manifold system and then vertically up through a porous membrane to the MEA.

The polyimide laminate bonding process can be utilized in the design of fuel cells. A porous membrane is desired in the fuel cells that allows the fuel to flow through a microfluidic channel horizontally from a common reservoir, then vertically through a prescribed array of holes which distribute the fuel over the surface area of the anode. The fuel flow may be assisted and controlled with micropumps and valves, including turnoff and isolation if necessary. The polyimide laminate microfluidic structure provides structural support for the fuel cell membrane and creates a tight seal around the periphery of the MEA.

Figure 2:
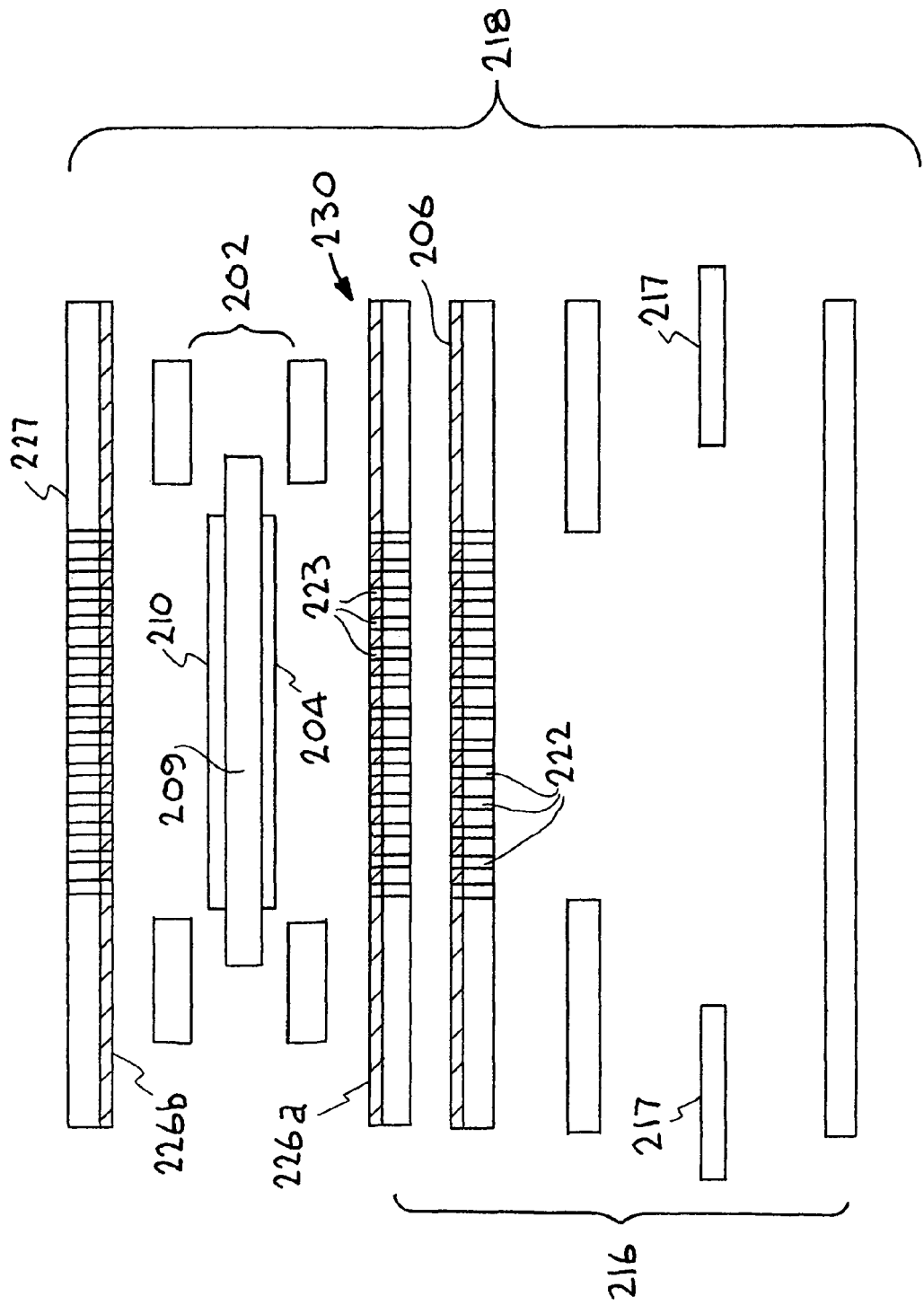
FIG. 2 shows an expanded view of a bonded and sealed microfluidic fuel cell package formed using a polyimide molding process.

FIG. 2 depicts another embodiment of a bonded and sealed microfluidic fuel cell package 218 formed using a polyimide laminate preform bonding process. Micropumps and valves (not shown) as well as isolation or turn off valves (not shown) can be incorporated into the fuel cell package 218 to enable control of the fuel flow. The polyimide preform laminate can form the microfluidic fuel distribution structure 216 which contains microfluidic interconnect ferrules 217 for fuel inlet and by product outlet. An MEA 202 comprising an anode 204, an electrolyte layer 209 and a cathode 210, can be positioned directly on the preformed host structure 230, such as, microfluidic fuel distribution structure 216. This allows connection to a plurality of microfluidic fuel distribution channels 222 through a plurality of micropores 223 covering the surface area of the anode, while allowing electrical connections, e.g., 226a, to the anode to be fed through the seal. The polyimide preform laminate material can directly seal to a glass, silicon, ceramic, plastic, PDMS or other laminate material substrates by surface bonding.

Metalization to form resistive heating elements for direct control of the MEA temperature and feedthrough electrical connections to extract the generated electrical power from the fuel cell can also be incorporated into the fabrication process. The process of metalization onto the surface of the polyimide layers does require some manipulation of the surface. Plasma etching the surface in oxygen plasma at 300 Watts for 1 minute or sputter bias etching prior to deposition are both effective surface treatments. An evaporation can be used to apply the metal to the surface of the plasma-etched substrate. An adhesion layer, such as chromium, is applied first at 2 angstroms/second for a 200-Angstrom layer. A metal layer, such as gold, is then evaporated onto the adhesion layer at 2 angstroms/second to obtain a 2000-Angstrom layer. Different patterns can be formed by using a shadow mask to block the evaporation over parts of the surface. A wide variety of metals can be used for conductive wires embedded as feedthroughs to extract the electrical power from the fuel cell electrodes. The choice of metal depends on adhesion and conductivity. Typical metals used include Au, Ni, Cu, Ti, Ag, Pt, and Al. Once the metal has been applied to the surface of the substrate, standard photolithography techniques can also be used to pattern the metal.

Other items can also be embedded within the polyimide laminate. For example, embedded capillary tubing can provide a leak-proof fluidic connection between the reservoir and the fuel cell package without using the normally necessary connectors that screw into the fuel cell package providing a compression seal with the tubing. Devices typically fabricated in glass or silicon could be embedded into the polyimide laminate making fluidic connections with capillary tubing even easier without the requirement of other hardware. This can be accomplished by thermoforming the polyimide film into a connector shape to which capillary tubing can be attached. Embedding the capillary tubing in this manner allows the delivery of a gaseous or liquid fuel to a microfluidic fuel cell and the distribution of air to a gas diffusion cathode structure.

Metal deposition techniques such as, sputter, e-beam, or screen printing, can be used to form embedded structures, such as, a plurality of resistive heating elements 206 for direct control of the MEA temperature, and/or a plurality of feedthrough electrical connections 226a and 226b to extract the electrical power generated. Electrical connection 226b can be sandwiched between the cathode and an air breathing electrode support structure 227. Patterns may be formed in the metal layer using standard photolithography techniques once a layer of metal has been applied to the surface of the substrate.

Referring to FIG. 2, fuel can be distributed to the surface area of fuel cell anode 204 through a prescribed array of holes 223 in a microfluidic channel 222 from a reservoir (not shown), with optional assistance and/or control from micropumps and valves (not shown). Anode 204 preferably has a large surface area, i.e, $>10^6/cm^2$. At anode 204, the structure is heated in the range of 60-90° C. to generate the electrochemical and catalytic reactions, e.g., $H_2 \rightarrow 2H^+ + 2e^-$ at the anode, and $4H^+ + 2O^{-2} \rightarrow 2H_2O + 4e^-$ at the cathode, which convert the fuel to electrical power. With appropriate anode catalyst materials, such as Pt—Ru, a vaporized feed of methanol-water mixture can be used. Typically, ratios of 0-50% Ruthium/50-100% Platinum are used. In this case, the anode reaction first converts the methanol-water mixture through the reaction $CH_3OH + H_2O \rightarrow 3H_2 + CO_2$, which then leads to the anode and cathode reactions as described above.

Figure 3A:
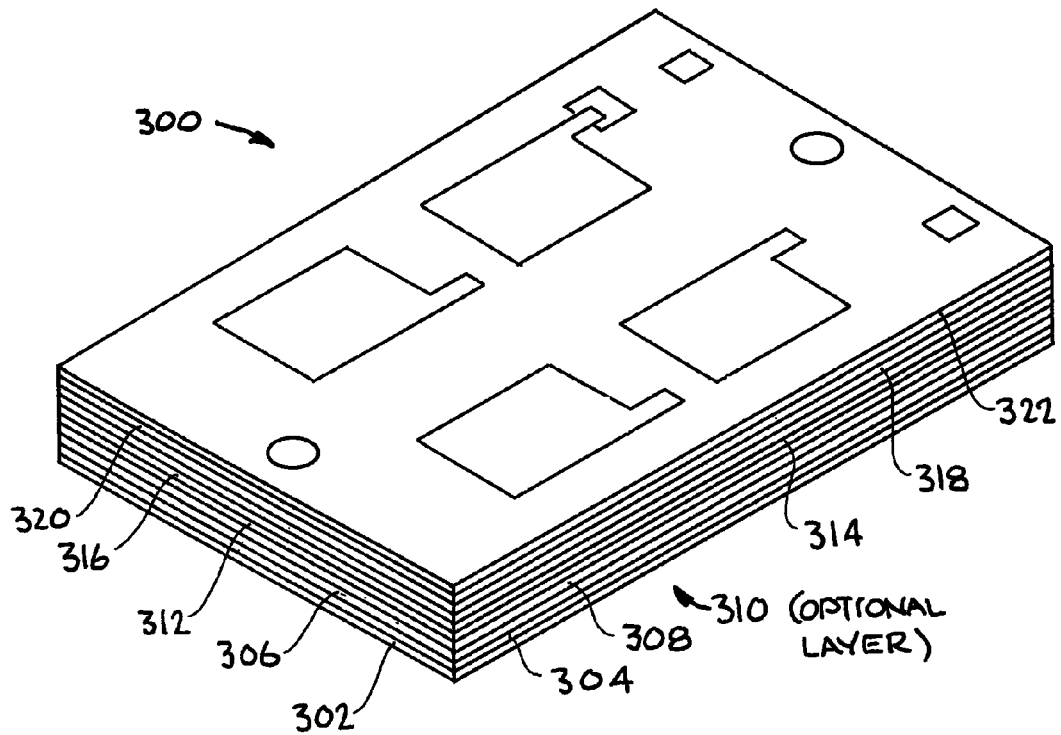
FIGS. 3A through 3L show the layers of one embodiment of a bonded polyimide microfluidic fuel cell system.

Another embodiment of a bonded polyimide microfluidic fuel cell system is shown in FIGS. 3A through 3L. Referring to FIG. 3A, a bonded polyimide microfluidic fuel cell system 300 comprising a number of bonded layers: a resistive heater polyimide layer 302, a first insulating polyimide layer 304, a microfluidic channel polyimide layer 306, an anode manifold polyimide layer 308, an optional porous membrane polyimide layer 310, an anode pad polyimide layer 312, a second insulating polyimide layer 314, an MEA layer 316, a metal pad polyimide layer 318, a cathode manifold polyimide layer 320, and a cathode pad polyimide layer 322.

Figure 3B:
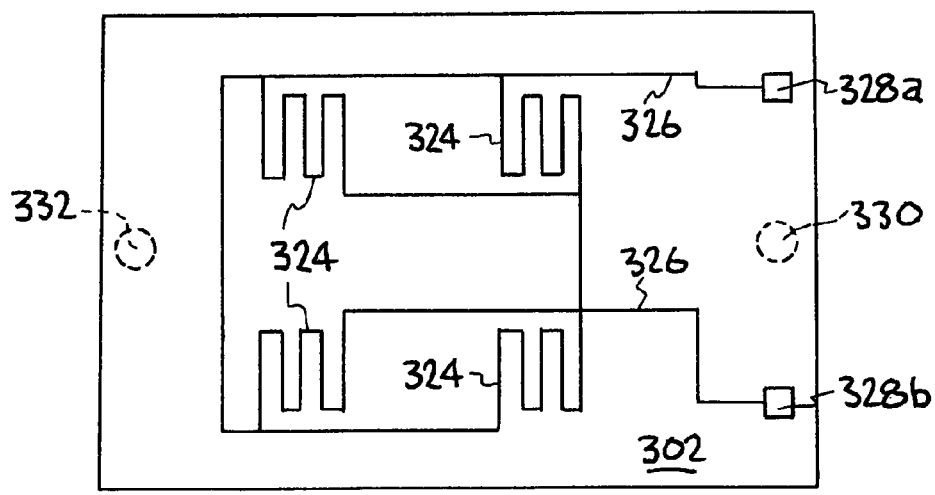

Referring to FIG. 3B, resistive heater layer 302 comprises a plurality of resistive heaters 324. The heaters can be formed by patterned shadow masking and metal deposition techniques. The heater circuits 326 terminate at conductive pads 328a and 328b. Resistive heater layer 302 can further comprise an inlet 330 and an outlet 332, depicted with dotted lines.

Figure 3C:
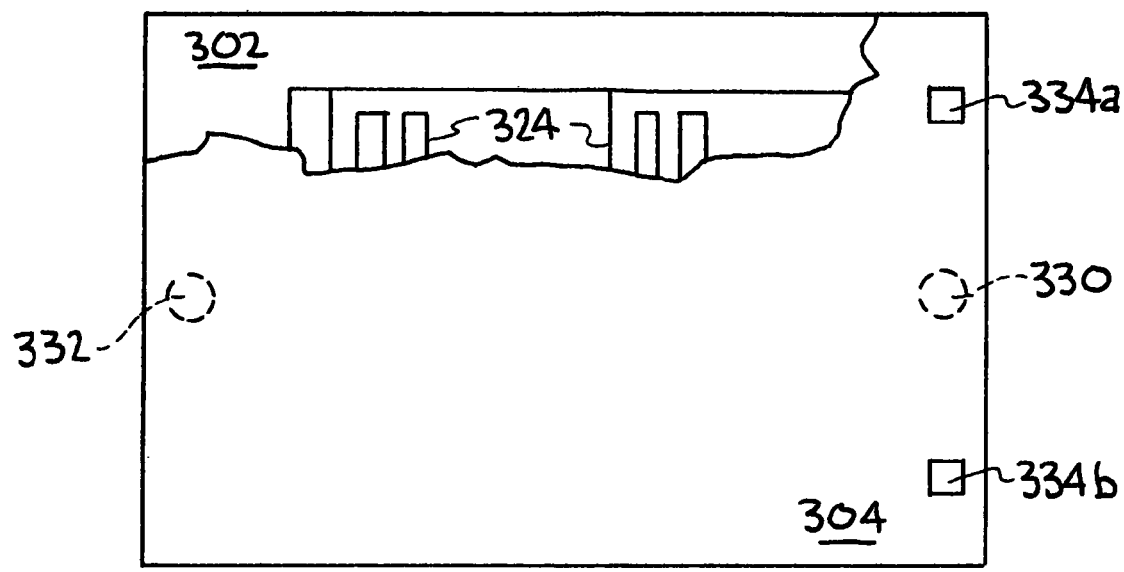

Referring to FIG. 3C, first insulation layer 304 comprises electrical vias 334a and 334b to permit an electrical path to power the resistive heaters of resistive heater layer 302. Electrical vias 334a and 334b are present in each succeeding layer of system 300 and are filled with an electrically conductive material, such as silver epoxy, once the system is assembled. First insulating layer 304 can further comprise inlet 330 and outlet 332.

Figure 3D:
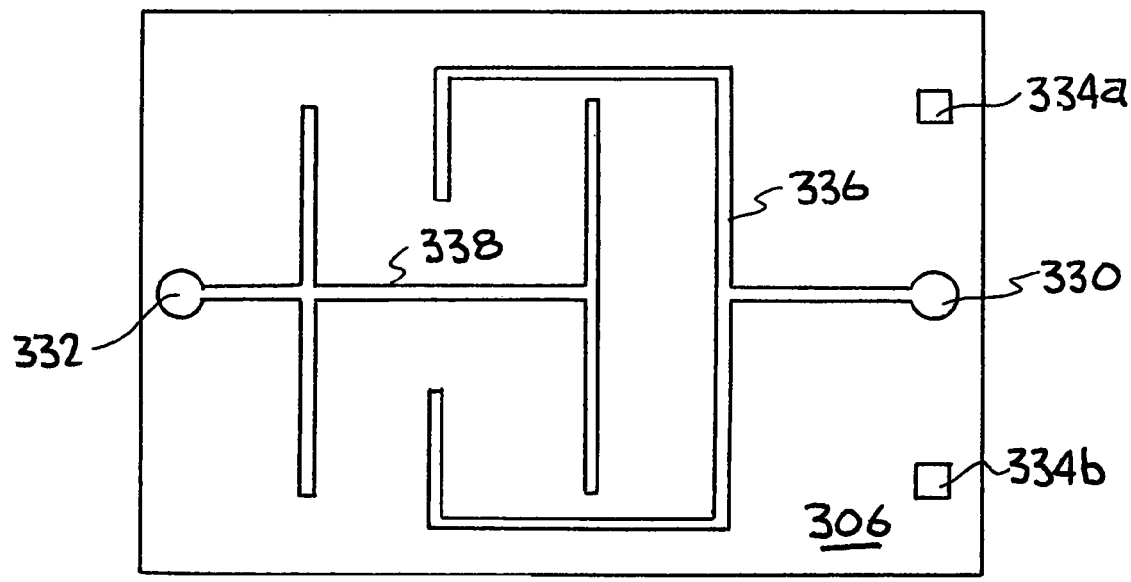

Referring to FIG. 3D, microfluidic layer 306 comprises inlet 330, outlet 332, electrical vias 334a and 334b, and at least one microfluidic inlet channel 336 that communicates with inlet 330 and at least one microfluidic outlet channel 338 that communicates with outlet 332.

Figure 3E:
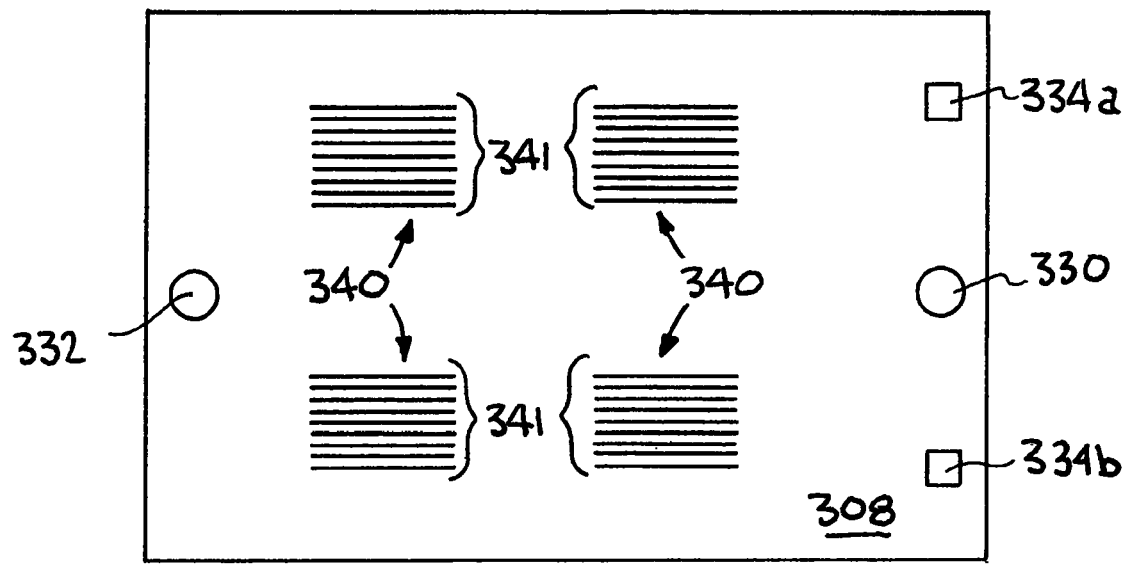

Referring to FIG. 3E, anode manifold polyimide layer 308 comprises inlet 330, outlet 332, electrical vias 334a and 334b, and anode manifold 340 having at least on anode area 341. Anode areas 341 comprise slits in the polyimide material of polyimide layer 308. Once assembled anode manifold layer 308 is positioned such that one end of the anode manifold will overlap with the microfluidic channels of polyimide layer 306 and the other end of the anode manifold with overlap with the microfluidic outlet channels of polyimide layer 306 providing a continuous path for fuel to flow. Fuel flows horizontally through inlet 330 and vertically up through the anode manifold 340 such that whatever portion of the fuel that is not consumed continues to flow horizontally through fuel outlet 332.

Figure 3F:
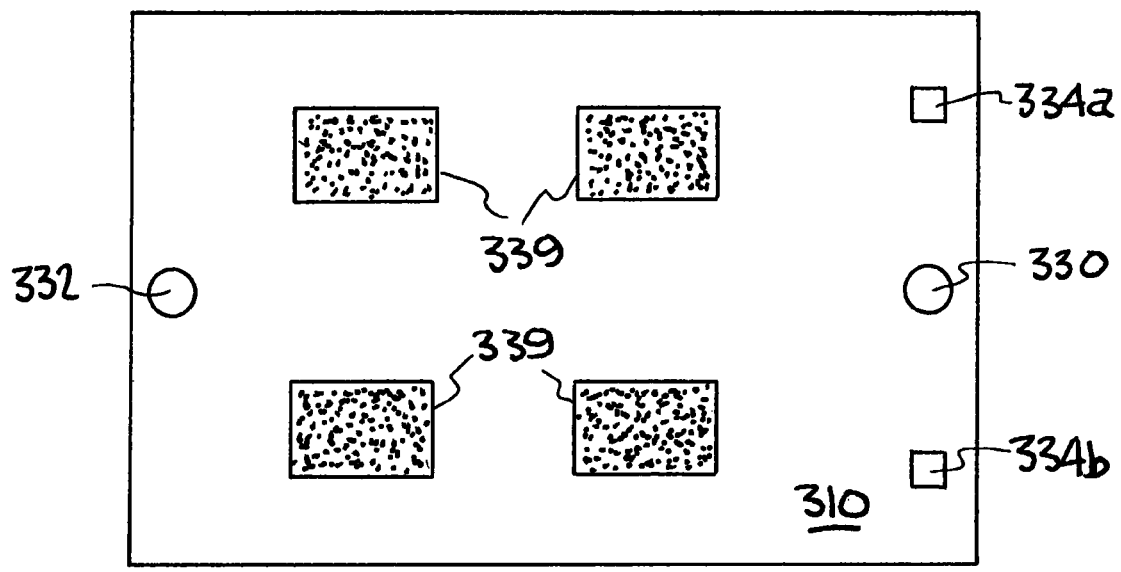

Referring to FIG. 3F, an optional porous membrane polyimide layer 310 is either a porous sheet of polyimide or a sheet of polyimide having porous areas 339 in line with the anode manifold of polyimide layer 308 such that polyimide layer 310 serves as an extension of anode manifold 340. Polyimide layer 310 further comprises inlet 330, outlet 332, electrical vias 334a and 334b.

Figure 3G:
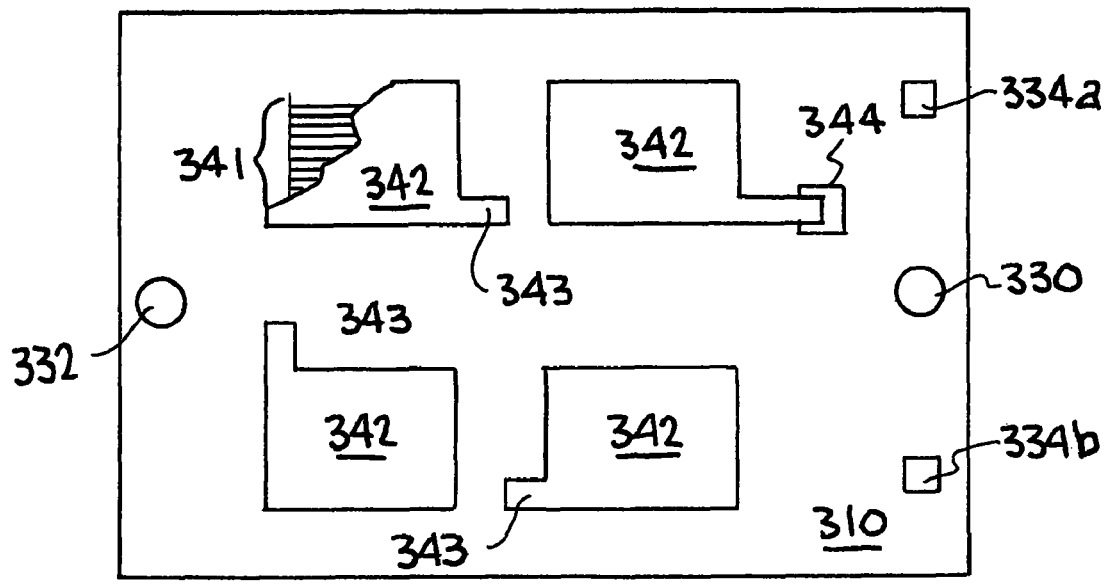

Referring to FIG. 3G, anode pad polyimide layer 310 comprises at least one anode pad 342 that terminates with a conductive pad 344. Additional anode pads, if present, terminate with an anode contact pad 343. Metal deposition and showdown masking is used to form the anode pads, conductive pad and contact pads.

Figure 3H:
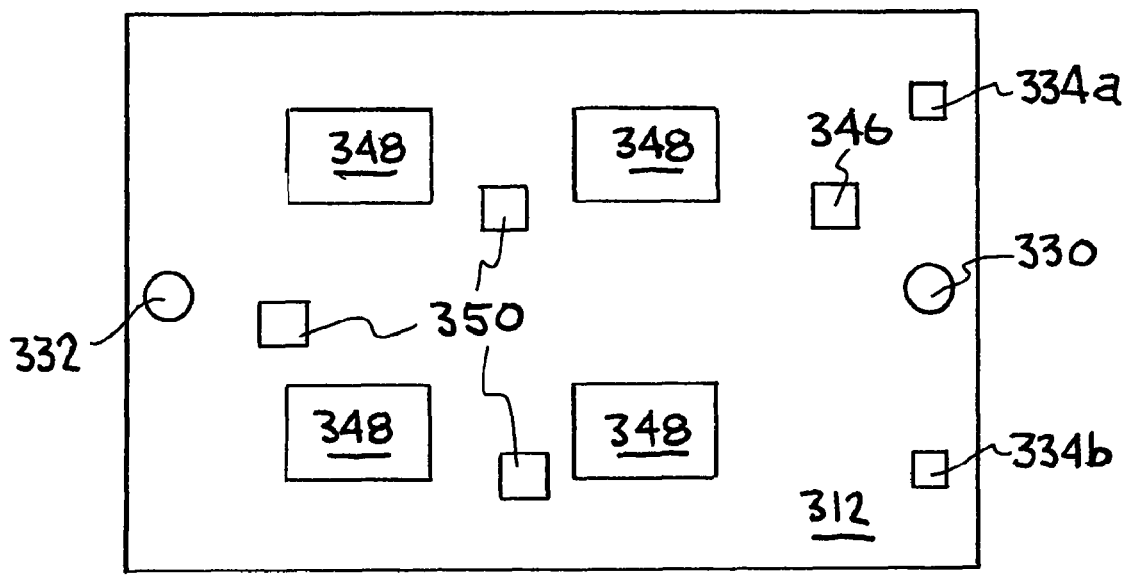

Referring to FIG. 3H, second insulating polyimide layer 312 comprises a conductive pad via 346 that is positioned in the same location on polyimide layer 312 as conductive pad 344 is on polyimide layer 310, an anode pad via 348 that is positioned in the same location on polyimide layer 312 as anode pad 342, a contact pad via 350 positioned in the same location on polyimide layer 312 as anode contact pad 343 is on polyimide layer 310, inlet 330, outlet 332, and electrical vias 334a and 334b.

Figure 3I:
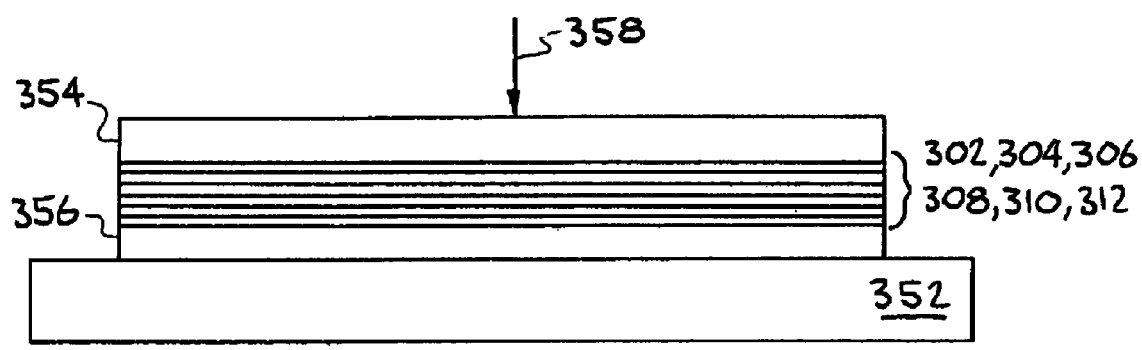

Referring to FIG. 3I, polyimide layers 320, 304, 306, 308, 310 (if present) and 312 are aligned one on top of the other and placed on a stainless steel fixture 352, then sandwiched between two pieces of glass 354 and 356, or other suitable material. A weight greater than 1 Kg which provides a force indicated by arrow 358 is placed on the sandwich and the entire fixture containing the polyimide layers is heated in an oven. The oven is ramped to 305° C. over 150 minutes (approximately 2° C./min.). Once the temperature reaches 305° C., the oven is turned off and the fixture is allowed to cool over several hours. Each polyimide layer is coated with a bonding adhesive, i.e., Dupont TEFLON® FEP, to prior to alignment with the successive layer.

Figure 3J:
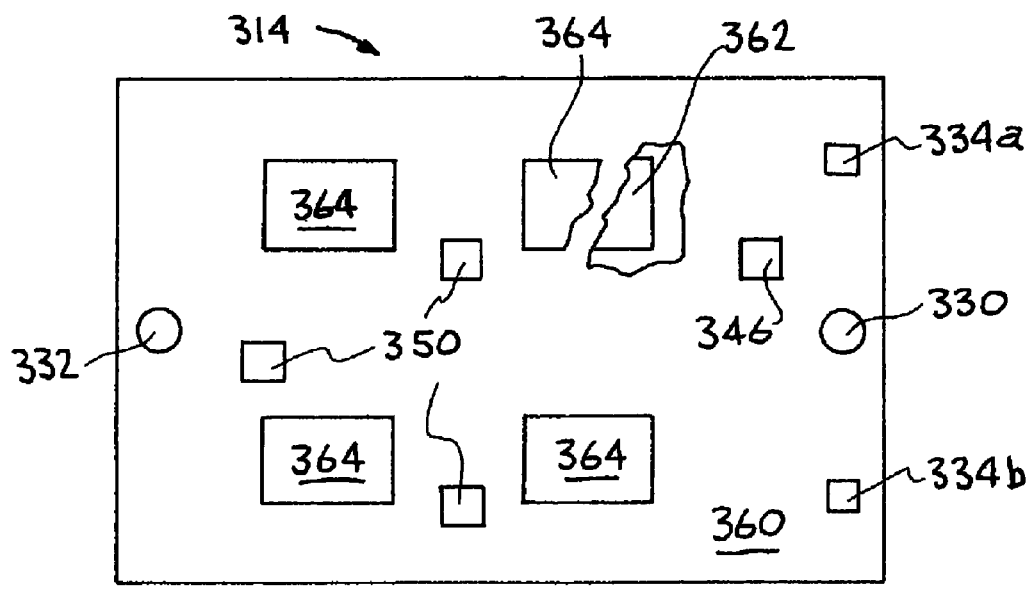

Referring to FIG. 3J, MEA layer 314 comprises a sheet of an electrolyte material 360, with at least one anode 362 on one side and at least one cathode 364 on the other side, inlet 330, outlet 332, electrical vias 334a and 334b, anode contact pad vias 350 and conductive pad via 346. Any MEA that operates at a temperature less than 200° C. is effective. Anode 362 is positioned such that it is communicating with anode manifold 340 either directly or through porous membrane layer 310, if present.

Figure 3K:
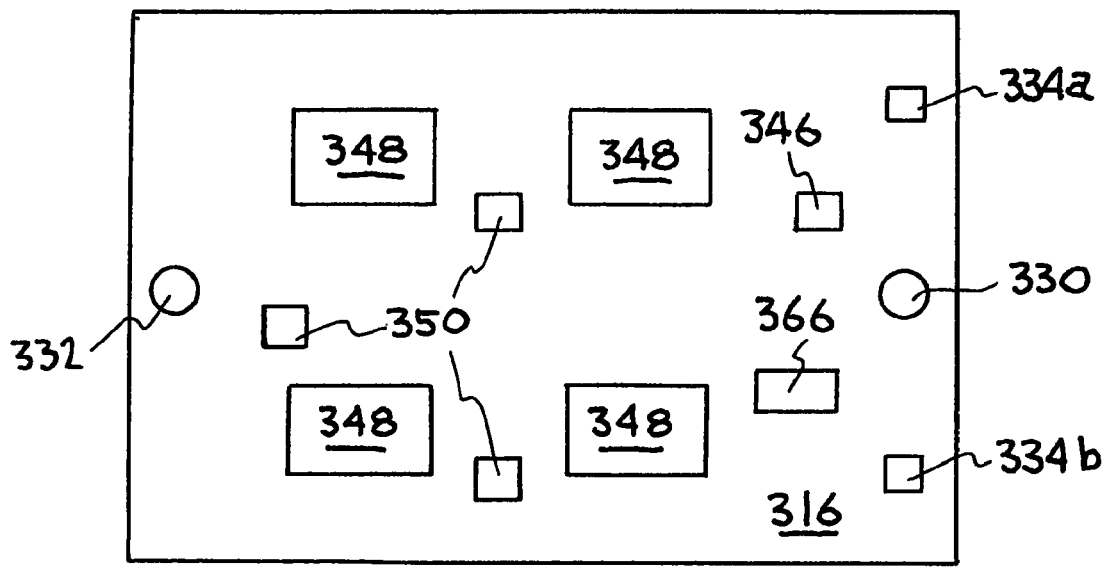

Referring to FIG. 3K, metal pad polyimide layer 316 comprises an electrical contact metal pad 366 formed by a shadow mask, metal deposition method, inlet 330, outlet 332, electrical vias 334a and 334b, anode contact pad vias 350, anode vias 348 and conductive pad via 346.

Figure 3L:
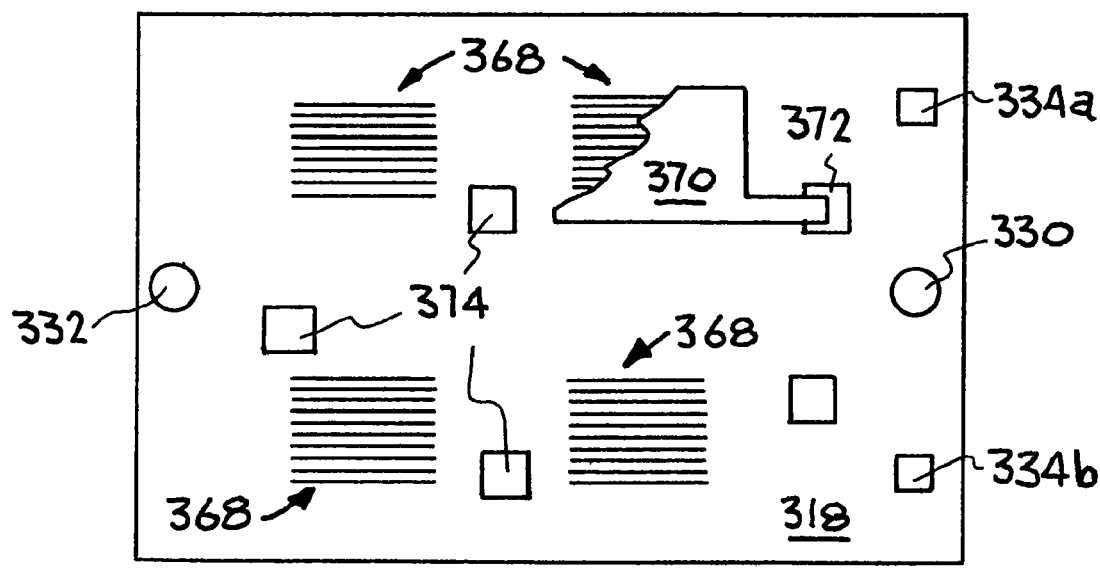

Referring to FIG. 3L, cathode manifold layer 318 comprises a cathode manifold 368, one cathode conductive pad 370 terminating with a conductive pad 372, inlet 330, outlet 332, electrical vias 334a and 334b. If more than one cathode pad is present, those cathode pads terminate with a contact pad 374. The cathode pads, conductive pad, and contact pads can be formed by a shadow masking metal deposition technique. Cathode manifold 368 comprise slits in the polyimide material of polyimide layer 318. Once assembled cathode manifold layer 318 is positioned such that reaction by-products can be removed from cathode 364.

The bonded polyimide fuel cell system is completed by first coating polyimide layer 316 with a low temperature adhesive, i.e., Dupont TEFLON® FEP, and positioning it on top of MEA layer 314 and second coating polyimide layer 318 with a low temperature adhesive, i.e., Dupont TEFLON® FEP, and positioning it on top of polyimide layer 316. The surfaces of polyimide layer 316 and polyimide layer 318 form a hermetic seal when heated to 120° C. An electrical feedthrough, extending through all the layers is formed by filling electrical vias with a conductive silver epoxy. Fuel cell system 300 is then cured at 120° C. for 1 hour.

An illustrative example follows.

EXAMPLE 1

Patterning of the following preform layers using a laser etch technique; 1.) Resistive heater-alignment targets, 2.) Heater isolation-alignment targets, electrical feedthroughs, 3.) anode manifold, microfluidic channels, electrical feedthroughs, 4.) Anode support manifold, fuel inlet/outlet feedthroughs, electrical feedthroughs, 5.) anode manifold seal, electrical feedthroughs, fuel inlet/outlet feedthroughs, 6.) cathode seals, fuel inlet/outlet seals, electrical feedthroughs, 7.) cathode support, cathode manifold, fuel inlet/outlet feedthroughs, electrical feedthroughs. Metal deposition is performed on layer 1 to form resistive heaters, layer 3 to form anode feedthroughs, and layer 6 to form cathode feedthroughs. These are patterned by shadowmask.

The preformed layers are then aligned in order, first layers 1-5 are placed on a fixture, sandwiched between two pieces of glass. A heavy weight is placed on them, and the entire fixture is placed in an oven, which is ramped to 305° C. over 150 min (approximately 2°/min). Once the temperature reaches 305° C., the oven is turned off and allowed to cool over several hours. A membrane supported MEA is then sandwiched between layer 5 and 6, creating adequate seals. The surfaces of layer 5 and 6 have a low temperature adhesive which forms a hermetic seal by heating to 120° C. Layer 7 is then aligned and bonded at 120° C. Electrical feedthroughs are formed using a conductive silver epoxy which fills the vias and is cured at 120° C. for 1 hour.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

The invention claimed is:

1. A fabrication process for a microfluidic fuel cell system comprising:
   patterning a plurality of polyimide preform layers;
   bonding a portion of said plurality of polyimide preform layers together;
   positioning an MEA layer containing an MEA onto said bonded portion of polyimide preform layers;
   positioning the remainder of said perform layers onto said MEA; and
   curing to form a bonded polyimide microfluidic fuel cell system, before using the polyimide microfluidic fuel cell system, wherein said bonded polyimide microfluidic fuel cell system has a means to electrically connect all layers.

2. The process recited in claim 1, wherein at least one layer of said bonded polyimide microfluidic fuel cell system has a means for distributing a liquid or gaseous fuel to the anode of said MEA, at least one layer of said bonded polyimide microfluidic fuel cell system has a means for removing liquid or gaseous by-products away from the cathode of said MEA, and at least one layer of said bonded polyimide microfluidic fuel cell system has a means for heating said MEA.

3. The process recited in claim 1, wherein said bonding is accomplished in two steps, (1) ramping the oven to a temperature of 305° C. over 150 minutes at a rate of approximately 2° C./ min.

4. The process recited in claim 1, wherein said curing of said bonded polyimide fuel cell system is accomplished by heating to a temperature of 120° C.

5. The process recited in claim 1, wherein said means to electrically connect all layers comprises vias in each layer that are filled with a conductive material.

6. The process recited in claim 5, wherein said conductive material is a silver epoxy.

7. A fabrication process for a microfluidic fuel cell system comprising:
   patterning a first plurality of polyimide preform layers, wherein at least one layer has means to heat an MEA, at least one layer has means to distribute fuel to the anode of said MEA;
   bonding a said first plurality of polyimide preform layers together;
   positioning an MEA layer containing an MEA onto said bonded polyimide preform layers;
   patterning a second plurality of polyimide perform layers, wherein at one layer has means to remove bi-products from the cathode of said MEA;
   positioning said second plurality of perform layers onto said MEA; and
   curing to form a bonded polyimide microfluidic fuel cell system, before using the polyimide microfluidic fuel cell system, wherein said bonded polyimide microfluidic fuel cell system has a means to electrically connect all layers.

8. The process recited in claim 7, wherein said bonding is accomplished in two steps, (1) ramping the oven to a temperature of 305° C. over 150 minutes at a rate of approximately 2° C/min.

9. The process recited in claim 7, wherein said curing of said bonded polyimide fuel cell system is accomplished by heating to a temperature of 120° C.

10. The process recited in claim 7, wherein said means to electrically connect all layers comprises vias in each layer that are filled with a conductive material.

11. The process recited in claim 7, wherein said conductive material is a silver epoxy.

12. A fabrication process for a microfluidic fuel cell system comprising:
   patterning a plurality of polyimide preform layers;
   bonding a portion of said plurality of polyimide preform layers together;
   positioning an MEA layer containing an MEA onto said bonded portion of polyimide preform layers;
   positioning the remainder of said perform layers onto said MEA; and
   curing to form a bonded polyimide microfluidic fuel cell system, before using the polyimide microfluidic fuel cell system, wherein said bonded polyimide microfluidic fuel cell system includes an electrical connection electrically connecting all layers.

13. The process recited in claim 12, wherein at least one layer of said bonded polyimide microfluidic fuel cell system includes a distribution system for distributing a liquid or gaseous fuel to the anode of said MEA, at least one layer of said bonded polyimide microfluidic fuel cell system including a return system for removing liquid or gaseous by-products away from the cathode of said MEA, and at least one layer of said bonded polyimide microfluidic fuel cell system including a heater for heating said MEA.

14. The process recited in claim 12, wherein said bonding is accomplished by ramping the oven to a temperature of 305° C. over 150 minutes at a rate of approximately 2° C./ min.

15. The process recited in claim 12, wherein said curing of said bonded polyimide fuel cell system is accomplished by heating to a temperature of 120° C.

16. The process recited in claim 12, wherein the electrical connection to electrically connect all layers comprises vias in each layer that are filled with a conductive material.

17. The process recited in claim 16, wherein said conductive material is a silver epoxy.

* * * * *